United States Patent [19]

O'Brien

[11] Patent Number: 5,039,243

[45] Date of Patent: Aug. 13, 1991

[54] FRAGRANCE RELEASING CRAYONS

[75] Inventor: Dennis P. O'Brien, St. Paul, Minn.

[73] Assignee: Minnesota Mining and Manufacturing Company, St. Paul, Minn.

[21] Appl. No.: 70,544

[22] Filed: Jul. 7, 1987

[51] Int. Cl.⁵ .............................. B43K 19/00
[52] U.S. Cl. ........................ 401/49; 434/84
[58] Field of Search ............. 401/49, 6, 96, 19, 82, 401/88; 132/88.5, 88.7, 79 C; 424/65, 64, 81, 89; 512/1, 4; 222/390; 273/157 R; 434/84

[56] References Cited

U.S. PATENT DOCUMENTS

| | | | |
|---|---|---|---|
| 2,188,796 | 1/1940 | Richards et al. | 401/49 X |
| 3,491,043 | 1/1970 | Zmitrovia | 260/23.5 |
| 3,516,941 | 6/1970 | Matson | 512/4 X |
| 3,686,701 | 8/1972 | Charle et al. | 15/104.93 |
| 3,769,045 | 10/1973 | Maierson et al. | 106/19 |
| 3,933,708 | 1/1976 | Brinkman | 260/23 |
| 3,947,571 | 3/1976 | Murphy et al. | 424/64 |
| 4,019,822 | 4/1977 | Matsumoto et al. | 401/96 |
| 4,351,748 | 9/1982 | Delay | 424/65 X |
| 4,602,886 | 7/1986 | Smit | 401/35 |
| 4,687,203 | 8/1987 | Spector | 273/157 |
| 4,728,212 | 3/1988 | Spector | 401/88 |
| 4,762,493 | 8/1988 | Anderson | 434/84 |

FOREIGN PATENT DOCUMENTS

| | | | |
|---|---|---|---|
| 3507469 | 4/1986 | Fed. Rep. of Germany | 401/49 |
| 0030399 | 6/1982 | Japan | 401/49 |

Primary Examiner—Richard J. Apley
Assistant Examiner—D. F. Crosby
Attorney, Agent, or Firm—Gary L. Griswold; Walter N. Kirn; Mark A. Litman

[57] ABSTRACT

Crayons are provided with microcapsules containing fragrant materials within the shell of the microcapsules. Applying color to surfaces ruptures some of the microcapsules and releasing a fragrance. Some microcapsules remain intact within the color applied to the surface and may be ruptured by abrading the coloration on the surface. The colors and fragrances may be chosen to correspond with each other.

27 Claims, No Drawings

FRAGRANCE RELEASING CRAYONS

BACKGROUND OF THE INVENTION

1. Field of the Invention

The present invention relates to crayons or wax pencils which contain microencapsulated fragrances within the crayon or wax composition.

2. Background of the Art

Crayons are well known writing or coloring implements which comprise a material that is solid or waxy at room temperatures but which evenly abrade or soften sufficiently upon the application of sliding abrasive force against one surface of the material. Crayons are usually provided as stick-like or cylindrical elements of the waxy material, generally with a protective wrapping around it. The waxy material may be either clear (to provide a shiny, colorless background) or pigmented to provide a color. Usually the material contains a sufficiently large amount of pigment so that a reflective optical density of 1 would be obtained with a 0.3 mm thick coating of the crayon material.

The waxy material may be a natural wax, synthetic wax, microcrystalline wax or any other type of material that exhibits conventional wax properties. That is, the material should be able to retain its general shape at room temperature (18° C.) for at least eight hours, the capacity to acquire gloss when rubbed, and the like. Common waxes which have been used in the formation of crayons and other writing implements include 1) esters of high molecular weight fatty acids with high molecular weight alcohols or fatty alcohols, 2) mixtures of esters with fatty acids and alcohols and hydrocarbons, 3) esters of fatty acids with high atomic weight alcohol radicals, either natural or synthetic, such as beeswax, or myricyl palmitate, carnauba wax, 4) synthetic polymers, particularly amorphous or microcrystalline polymers such as polypropylene, polyethylene, terpen resins, phenolic resins and the like. The use of many of these materials in the formation of crayons is described in U.S. Pat. Nos. 3,491,043 and 3,933,708. The crayons generally also include dyes and/or pigments in the waxy composition to provide the desired colors to them.

U.S. Pat. No. 4,602,886 describes the addition of discreetly colored wax chips into crayon compositions so that multicolored markings can be made from a single crayon.

Microencapsulation has been known for a number of years as a means for providing a surface coating onto layers to provide accessible aromas. Sometimes the microcapsule coatings are used to provide image forming materials. In general, however, these microencapsulated materials are liquid or free-flowing composition and then dried to form a layer of binder with the microcapsules therein. Representative examples of such uses are shown by U.S. Pat. Nos. 4,487,801; 4,201,404; 4,186,743; 3,516,941; 4,251,386; 4,100,103; 4,089,802; 4,087,376; 3,778,383; and British Patent Specification Nos. 1,156,725; 2,041,319; and 2,048,206. As shown in these references, the principle means of providing the microencapsulated materials is in the formation of a surface coated with unruptured microcapsules in a thin binder layer.

U.S. Pat. No. 3,686,701 describes a shaped cosmetic applicator support containing rupturable microcapsules containing solvents for removing nail enamel. The microcapsules can also contain perfume to mask the odor of the solvents.

U.S. Pat. No. 3,769,045 describes a liquid write crayon comprising wax and encapsulated marking liquid wherein the pressure generated by writing causes the capsule to break and the marking liquid to be deposited on the marked surface.

SUMMARY OF THE INVENTION

This invention relates to coloring crayons which contain fragrances other than the wax aroma provided by the substantial ingredients of crayons and especially encapsulated fragrances within the coloring composition. Writing with the crayons releases fragrances or ruptures some of the microcapsules, releasing the fragrance. Unruptured capsules are also transferred with the crayon markings and may be subsequently ruptured by pressure or abrasion.

DETAILED DESCRIPTION OF THE INVENTION

Writing implements are made according to the practice of the present invention by incorporating fragrances other than the wax fragrances provided by the substantial ingredients of crayons (i.e., the binder or its components) and especially microencapsulated fragrances into a friction transferable binder. By the term "friction transferable binder" is meant a composition which is generally solid at room temperature (18° C.) and with a circular contact area comprising the side of a 4 cm length of crayon having a 16 mm diameter against unprinted newspaper stock with a force of 4.6 Kg will transfer between 0.002 g/50 cm$^2$ contact area and 0.04 g/50 cm$^2$ contact area when moved under that force against the paper (for a length of 12.5 cm). This limitation excludes conventional lead pencils (graphite pencils) and hard coloring pencils. So little material is transferred or used by those implements that there could be little effective release or transfer of encapsulated fragrance. Materials suitable for use as the composition in crayons, medium to soft chalks, and very soft grease pencils would be useful in the practice of the present invention. It is particularly useful to have thermally softenable compositions such as the wax-type compositions found in crayons as the binder composition used in the practice of the present invention. Waxes, both synthetic and natural, wax compositions and blends, and generally available wax-like compositions are preferred in the practice of the present invention. These waxes may contain other ingredients well known in the art such as solvents, thickeners, coating or extrusion aids, fillers, and the like. It is particularly desirable to have pigments, dyes or combinations of pigments and dyes present in the crayons. It is especially preferred to have colors and fragrances within the microcapsules correspond to a relationship of color and fragrance. That is, the color should have a strong connotation for the fragrance. Thus red could correspond to cherry or strawberry fragrances, brown could correspond to chocolate, tan could correspond to leather, yellow to lemon, green to lime, orange to oranges, purple to grapes, and the like. When there are protective or decorative wrappings on the crayons, there could be printing which clearly sets out a name that relates the color and fragrance by incorporating both fragrance and color words into the name, as for example "Strawberry-Red", "Apple-Red", "Cherry-Red", "Lime-Green", "Skunk-Black", "Grape-Purple", "Plum-Purple", "Coconut-White", "Grass-Green", "Cotton Candy-Pink", and the like.

Generally the capsules should have an average diameter between 6 and 100 microns and preferably between 8 and 50 or between 12 and 30 microns when the capsule payload is between 80 and 90% by weight of the total capsule weight. It is highly preferred that the capsules have an average diameter between 14 and 26 microns and it is most preferred that the capsules have a diameter between 15 and 25 microns. With lower payloads (e.g., 70-80%), the capsules should be larger to provide the necessary rupture strength. The broadest range of capsule size under any conditions would be about 4 to 100 microns, with 8 micron capsules used with a 90-95% by weight payload. These capsules may be made by any known process such as those described in U.S. Pat. Nos. 3,516,846; 3,516,941 and 4,087,376.

As previously noted, the size of the capsules has a desirable effect upon the practice of the present invention. With capsules of less than 8 microns, there tends to be less rupturing of the capsules during writing. Above 30 microns, the particles are so large that they are more readily burst by writing procedures. The preferred range of 8 to 30 microns is therefore important to a balanced practice of the present invention. Within these limits, rupture in excess of 50 percent of the capsules can be easily obtained during writing.

The crayons may be formed by simply blending the microcapsules into the writing composition before the composition is poured into molds. Because the capsules can be made mildly resistant to elevated temperatures and because the molding process does not apply significant abrasion or pressure to the capsules, there tends to be little rupturing of the capsules during formation of the writing elements. It has been found that the crayons may be loaded with microcapsules over a very broad range. For example, weight loadings of 1 to 60% have been used effectively. It appears that loadings of 2 to 40% for the fragrances or the capsules are preferred and loadings of 2 to 30% most preferred to maintain a good balance between the properties of the crayon as a writing implement and a fragrance releasing device.

The following procedures are used in the practice of the present invention to measure and to define the transfer rate of the wax writing instrument. A tubular section of the wax writing material is supported with a constant weight pressing it against a writing surface. Either the surface is pulled beneath the weight or the wax material is moved with a force perpendicular to the direction of the weight so that the weight remains constant. The side of a crayon is placed against the writing surface, and the area over which an application is made and the weight of material transferred to the writing surface is measured. For example, a 4 cm length of crayon having a 16 mm diameter is moved in a 12.5 cm path on a clean area of a paper (75 g/m$^2$ white bond paper) sheet. This means that the application was done on a 50 cm$^2$ area (4 cm × 12.5 cm). The application areas were normalized to 50 cm$^2$ in all cases.

With lipstick under a 0.91 Kg load with a 12.5 mm diameter, the weight of material transferred was 0.0934 g/50 cm$^2$ (±0.0097 g/50 cm$^2$). Crayons on the other hand, under a 4.6 Kg load with a 16 mm diameter, transferred only 0.0095 g/50 cm$^2$ (±0.0013 g/50 cm$^2$). In general, under a 4.6 Kg load with a diameter of the wax implement of 16 mm, the range of weight transfers to paper for crayons would be less than 0.4 g/cm$^2$ for all different hardness of crayons. The range of weight transfer for all writing implements according to the present invention should be between 0.002 g/50 cm$^2$ and 0.04 g/50 cm$^2$ with 4.6 Kg force on a 4 cm length, 16 mm diameter writing implement. Preferably the rate of transfer would be between 0.004 and 0.02 g/50 cm$^2$ under those loading conditions. This rate of transfer would clearly exclude lipsticks and hard writing implements such as graphite pencils and grease pencils.

EXAMPLES

In the following examples all the crayons were Crayola ® brand crayons manufactured by Binney & Smith Inc., Easton, Pa., the molds for remolding the new crayons in Examples 2 and 3 were 3 cc plastic medical syringes and the fragrant microcapsules were manufactured by the process described in U.S. Pat. No. 3,516,941.

EXAMPLE 1

10.35 grams of crayons were placed in a beaker on a hot plate and heated to 95° C. with occasional stirring until completely melted. 0.84 grams of urea-formaldehyde microcapsules with a perfume fragrance encapsulated therein were dried in a lab oven at 60° C. for two hours and slowly added to the melted crayons in the beaker and stirred while maintaining the mixture temperature at 95° C. The mixture was then poured into a trough mold and allowed to cool to room temperature. The newly molded crayon was removed from the mold and placed in a flowing air container for two hours to degas or remove any fragrance caused by rupture of the microcapsules during processing. This step also assures the absence of odor prior to use of the crayon.

The crayon was then used to color on a sheet of paper. Immediately upon using the crayon, the perfume fragrance was detected and lasted over 24 hours. Further release of the fragrance was possible by scratching the colored portion of the sheet of paper and this fragrance again lasted for over 24 hours.

EXAMPLE 2

Example 1 was repeated using 7.5 grams of crayon and 0.75 grams of the perfume microcapsules, heated to 75° C., molded in a plastic syringe, allowed to cool to room temperature, removed from the mold and degassed as in Example 1. The crayon was tested as in Example 1 and the results were identical.

EXAMPLE 3

Eight batches of new crayons were made as in Example 2 using eight different fruit or herbal fragrant urea-formaldehyde microcapsules available from Minnesota Mining and Manufacturing Company, St. Paul, Minn. with stock number as follows:

| Licorice | E-86-01-20-02 | Orange | E-86-02-06-03 |
| Blueberry | E-86-02-19-05 | Grape | L-86-01-14-04 |
| Chocolate | E-86-01-07-03 | Cherry | E-86-06-10-02 |
| Juniper | E-86-06-10-04 | Banana | E-86-01-07-05 |

Each batch was made with a 20% by weight loading of microcapsules in a crayon with a color selected to appropriately match the fragrances (e.g., black for licorice). The crayons were used and tested as in Example 1 and the results were identical.

What is claimed is:

1. A writing implement comprising a friction transferable binder, colorant and frangible microcapsules containing liquid fragrant materials therein, said friction transferable binder transferring to a paper surface in an amount of between 0.002 g/50 cm² and 0.04 g/50 cm² with a 4.6 kg load on a 4 cm length, 16 mm diameter implement.

2. The writing implement of claim 1 wherein said liquid fragrant material has a relationship to the colorant in said implement.

3. The implement of claim 2 having a paper sheath around the outside thereof.

4. The implement of claim 3 wherein said paper sheath has printing thereon.

5. The implement of claim 3 wherein said friction transferable binder comprises microcrystalline wax.

6. The writing implement of claim 3 in which the binder, colorant, and microcapsules provide a reflective optical density of 1 with a 0.3 mm thick coating.

7. The implement of claim 3 in which said microcapsules comprise urea-formaldehyde microcapsules.

8. The implement of claim 2 wherein said friction transferable binder comprises microcrystalline wax.

9. The implement of claim 8 in which said microcapsules comprise urea-formaldehyde microcapsules.

10. The implement of claim 2, wherein said liquid fragrant materials are aromas selected from the group consisting of licorice, blueberry, chocolate, juniper, orange, grape, cherry, banana, strawberry, apple, lime, skunk, plum, coconut, grass, cotton candy, and lemon.

11. The writing implement of claim 10 in which the binder, colorant, and microcapsules provide a reflective optical density of 1 with a 0.3 mm thick coating.

12. The implement of claim 10 in which said microcapsules comprise urea-formaldehyde microcapsules.

13. The writing implement of claim 2 in which the binder, colorant, and microcapsules provide a reflective optical density of 1 with a 0.3 mm thick coating.

14. The implement of claim 1 having a paper sheath around the outside thereof.

15. The implement of claim 14 wherein said paper sheath has printing thereon.

16. The implement of claim 15 in the shape of a crayon.

17. The writing implement of claim 15 in which the binder, colorant, and microcapsules provide a reflective optical density of 1 with a 0.3 mm thick coating.

18. The implement of claim 14 wherein said friction transferable binder comprises microcrystalline wax.

19. The writing implement of claim 14 in which the binder, colorant, and microcapsules provide a reflective optical density of 1 with a 0.3 mm thick coating.

20. The implement of claim 1 wherein said friction transferable binder comprises microcrystalline wax.

21. The implement of claim 1 in the shape of a crayon.

22. The implement of claim 21 in which said microcapsules comprise urea-formaldehyde microcapsules.

23. The writing implement of claim 1 in which the binder, colorant, and microcapsules provide a reflective optical density of 1 with a 0.3 mm thick coating.

24. The implement of claim 23 in which said microcapsules comprise urea-formaldehyde microcapsules.

25. The implement of claim 1 in which said microcapsules comprise urea-formaldehyde microcapsules.

26. A writing implement consisting essentially of a friction transferable binder, colorant and frangible microcapsules containing liquid fragrant materials therein said friction transferable binder transferring to a paper surface in an amount of between 0.002 g/50 cm² and 0.04 g/50 cm² with a 4.6 kg load on a 4 cm length, 16 mm diameter implement.

27. The implement of claim 26 in which said microcapsules comprise urea-formaldehyde microcapsules.

* * * * *